(12) United States Patent
Merold et al.

(10) Patent No.: US 12,200,048 B1
(45) Date of Patent: Jan. 14, 2025

(54) PEER-TO-PEER DATA MESSAGE MATCHING

(71) Applicant: Chicago Mercantile Exchange Inc., Chicago, IL (US)

(72) Inventors: Michael S. Merold, Sparta, NJ (US); Mark Bucaj, White Plains, NY (US); Igor Douglas Nevistich, Madison, NJ (US); Richard Wenzel, Jersey City, NJ (US); Michal Sheves, New York, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/238,187

(22) Filed: Aug. 25, 2023

(51) Int. Cl.
*G06F 15/16* (2006.01)
*G06Q 40/04* (2012.01)
*H04L 67/104* (2022.01)

(52) U.S. Cl.
CPC ........... *H04L 67/104* (2013.01); *G06Q 40/04* (2013.01)

(58) Field of Classification Search
CPC .............................. H04L 67/104; G06Q 40/04
See application file for complete search history.

(56) References Cited

U.S. PATENT DOCUMENTS

| | | | |
|---|---|---|---|
| 5,375,055 A | 12/1994 | Togher et al. | |
| 7,853,499 B2 | 12/2010 | Czupek | |
| 7,966,368 B2 | 6/2011 | Su | |
| 10,306,426 B2 | 5/2019 | Olof-ors | |
| 10,692,143 B2 | 6/2020 | Studnitzer et al. | |
| 11,551,300 B2 | 1/2023 | Koziol et al. | |
| 2002/0143944 A1 | 10/2002 | Traversat | |
| 2003/0208621 A1 | 11/2003 | Bowman | |
| 2014/0114834 A1 | 4/2014 | Olof-ors | |
| 2023/0153904 A1 | 5/2023 | Van Niekerk | |

FOREIGN PATENT DOCUMENTS

EP 2503804 B1 5/2017

OTHER PUBLICATIONS

Extended European Search Report from European Patent Application No. 24195858, dated Nov. 25, 2024, 14 pages.

*Primary Examiner* — Joseph R Maniwang
(74) *Attorney, Agent, or Firm* — Lempia Summerfield Katz LLC

(57) ABSTRACT

The disclosed embodiments relate to systems/methods for data message matching in a peer-to-peer exchange system. Within the peer-to-peer exchange system, a dedicated processing instance attempts to match incoming data messages to resting message previously converted to the market data by other dedicated processing instances within the peer-to-peer exchange system. The market data stored within mirrored data structures on the dedicated processing instances, such that each instance may individually and independently attempt to match its respective data messages to all currently resting messages. When the incoming data message at least partially fails to be matched, the dedicated processing instance may determine whether to convert the unmatched portion to a resting message within the market data.

21 Claims, 5 Drawing Sheets

PEER-TO-PEER DATA MESSAGE MATCHING

BACKGROUND

With regard to trading of financial instruments, there may be two primary modes of trading used: bilateral and central counterparty. In bilateral trading, the parties to a trade effectively negotiate the parameters of that trade between themselves. In contrast, in a central counterparty based system, the parties submit their orders to trade to an intermediary which, in typical implementations, anonymously matches those orders with suitable counterorders submitted by other parties. For either bilateral or central counterparty, electronic trading systems are available to facilitate the electronic submission of orders to trade, e.g., buy or sell, instruments offered for trading by those systems, the matching of orders with suitable counter orders, clear trades, such as via third party clearing service, e.g., CLS, as well as provide access to information regarding available offers, completed trades and other "market" information. In addition, both bilateral and central-counterparty based electronic trading systems may provide risk management, clearing and settlement services to facilitate the completion of trades and the fulfillment of the obligations of the traders per the terms of their agreements.

As used herein, an order, order to trade or trade order refers to a willingness/desire of a trader to enter into a trade/transaction, and more particularly, to an electronic request or data message transmitted to, or received by, an electronic trading system which includes data indicative thereof, such as identity of a product, desired quantity, desired price, side (buy/sell), etc. As used herein, the term trade, executed trade, completed trade, etc., may refer to an agreement between two parties, each to fulfill an obligation defined by the transaction, and may further refer to a given order and the one or more suitable counter orders with which the given order has been matched and/or further cleared and/or settled. Orders may typically be canceled or modified by the submitting trader prior to them being matched with a suitable counter order. Once executed, the trader typically must fulfill their obligation unless they transfer, e.g., sell, or offset, such as be entering into an opposing trade, that obligation to another trader prior to the date on which fulfillment of their obligation is required.

In contrast to bilateral trading systems, central counter party-based trading utilizes an intermediary entity/system to separate the transacting parties such that, within the system, they are prevented from transacting/negotiating directly with one another, or, in most cases, even knowing the identify of their counterparty. For example, a central counterparty based electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity or other underlier, such as a currency, at a specified price at a predetermined future time. An option contract is the right, but not the obligation, to sell or buy the underlying instrument (in this case, a futures contract) at a specified price, referred to as the strike price, on or before a certain expiration date. An option contract on a futures contract, e.g., having a futures contract as an underlier, offers an opportunity to take advantage of futures price moves without actually having a futures position and is considered "in the money" when the strike price is favorable to the market price of the underlier. The commodity, instrument or asset to be delivered in fulfillment of the contract, or alternatively the commodity, instrument or asset for which the cash market price shall determine the final settlement price of the futures contract, is known as the contract's underlying reference or "underlier." The underlying or underlier for an options contract on a futures contract is the corresponding futures contract that is purchased or sold upon the exercise of the option. Options contracts traded via a central counterparty-based trading system may be referred to as Exchange Traded Derivative (ETD) options or ETD options contracts.

Typically, as opposed to typical bilateral contracts, e.g., forward contracts, the terms and conditions of each futures contract are standardized as to the specification of the contract's underlying reference commodity, the composition of the commodity, quantity, delivery date, and means of contract settlement. Such standardization may improve the liquidity of these contracts, e.g., the ease with which such contracts may be bought or sold. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives. At expiry, an option on futures, if in the money (ITM), described in more detail below, provides a cash settled payment plus the underlying futures contract, and if out of the money (OTM), it provides nothing. As will be discussed, an underlier of a futures contract may be a currency, e.g., the contract may be for delivery on a specified date of a quantity of Euros in exchange for a defined payment in U.S. dollars.

Aside from the above differences, bilateral and central-counterparty based trading systems differ in terms of who bears responsibility for counterparty risk, i.e., the risk of financial loss to one party to a trade due to the actions, inactions, or consequences thereof, such as the failure to perform on their obligations specified in the transaction, of the counterparty thereto.

In bilateral trading, each party, or intermediary agent, e.g., a prime broker or other access agent, via which that party trades, is, generally, directly responsible for the risk of loss in any given trade if their counterparty, or intermediary agent, e.g., a prime broker or other access agent, via which that counterparty trades, fails to perform. For example, in a cash/OTC market, prime brokers may create a central-counter party-like consolidation of counterparty risk to form a multi-tier structure where large participants, such as other prime brokers or very large banks, have bilateral risk. Bilateral electronic trading systems, such as the CME-EBS system described herein, may support a three tier structure where large, credit worthy entities, i.e., prime brokers, interact bilaterally and large to medium size trading entities access the market through those entities. Prime customers can also establish themselves as access agents, referred to as prime-of-prime brokers, servicing small and non-financial entities referred to as prime-of-prime customers. This model could be extended to any number of levels, but in practice three levels (bilateral, prime, and prime-of-prime) meet most business needs. As such, bilateral trading parties typically require credit verification or other guarantees, or risk mitigations, such as collateral, from their counterparties and often, as will be described, set limits on the amount of risk/exposure they are willing to undertake with a given counterparty. Such limits, which may be referred to as "hard limits," preempt transactions to prevent a limit overrun and may be applied to whether or not an order trade is accepted and/or whether or not it is executed, and/or to filter or mediate the distribution of data related thereto. In contrast, a soft limit may be applied after trade execution and therefore, more loosely enforced. Accordingly, bilateral electronic trading systems, as will be described, typically provide risk mitigations systems in the form of credit limit mechanisms, referred to as credit controls, which allow parties, for example, to define credit limits with respect to their potential counterparties which restrict the extent/magnitude of risk exposure and have the electronic trading system monitor, manage and enforce those limits on their behalf, as well as assist the parties in understanding and managing any credit limits to which they are subject. As any given party may enter into transactions with a myriad of counterparties, the number of different credit limits which a bilateral electronic trading system may have to maintain, manage and enforce may be substantial, as is the volume of transactions against which such limits must be assessed and accounted for.

The EBS Direct Platform may be referred to as a Quote Driven Market (QDM), also referred to as a price driven market, which limits trading to binding quotes provided by designated participants, e.g., market makers or dealers, etc. Whereas an Order Driven Market (ODM) may be more transparent, providing visibility, e.g., via an order book database, to all individual market orders to trade, a QDM provides liquidity by guaranteeing quoted prices. That is, in an ODM, a trader may place an order to buy or sell at a desired price but there is no guarantee that another trader will place a suitable counter order thereto to be matched by the ODM's electronic matching engines and traded. In a QDM, orders placed in the QDM's electronic quote matching systems against a submitted quote are essentially guaranteed to be fulfilled but quotes available at different prices may be limited. Other types of markets, including hybrid ODM-QDM markets, may also exist.

More particularly, a QDM may be considered a relationship-based model where there is limited anonymity—participants know their counterparty prior to transacting. Generally, in a QDM, participants play one or both of two discrete roles, liquidity providers (LP) and liquidity consumers (LC). These roles are fundamental, but can be blurred by some platform features. In an ODM, the participants are more equal where in the general case any participant can be a provider or a consumer. In a QDM, an LP prices their market data based on a priori evaluation and classification of consumers. In ODM, makers submit their orders that are priced without knowledge of the potential counterparty to a trade. Another difference is that in a QDM, LP's submit market data and consumers submit orders against that market data (the QDM platform often will aggregate and filter provider market data). Another way to consider these types of platforms it to consider business usage. For very liquid instruments that have efficient pricing (tight spread with reactive/volatile pricing). a central limit order book (CLOB) or ODM platform may provide the safest venue for exchanging risk due to efficient price discovery and collective wisdom of the market to set the price. When an instrument's price is very stable (not volatile) and/or market liquidity is thin (manifesting a wide bid/offer spread in a CLOB for example), a QDM platform may be preferred because the foreknowledge of one's counterparty allows quoting a tighter spread with greater safety and the consumer being able to know their provider allows certainty of fairness. When an instrument is very illiquid and/or specialized to the point that a provider can't safely provide a continuous price to a collection of similar consumers, then bespoke pricing method become helpful—these are referred to as request for quote or request for stream. Consumers ask for a price in an instrument and provider with knowledge of the consumer and current market conditions can elect to provide a price or stream of prices to the consumer. Knowledge of counterparty and full consideration of current conditions replace the wisdom of the market that would be present in a CLOB. RFQ/RFS is the oldest form of trading. "How much do you want for that? Or How much will you give me for this?" RFQ/RFS systems often support haggling or negotiated pricing features.

Current financial instrument trading systems allow traders to submit orders and receive confirmations, market data, and other information electronically via an electronic communications network at one or more execution venues, e.g., which implement/provide ODM and/or QDM type markets. These platforms may be geographically dispersed for the convenience of the traders or operator thereof and/or so as to be located geographically, i.e., in particular geographic regions, and/or logically, close to traders in order to, for example, minimize latency therebetween.

In many cases, provider/consumer dichotomies that may be present in QDM systems may prevent trading that would otherwise be desirable to the involved parties. For example, a provider-type participant in a QDM system may provide quotes that are viewed by consumer-type participants in an asymmetric relationship. In other words, the provider provides quotes while the consumer consumes the quotes, but the consumer may be barred from providing quotes themselves (and/or the only supported bilateral party for a consumer provided quote may be a provider).

In various contexts, participants may be amenable to trading with various other entities but may not be amenable to that full set of other entities view all quotes that the participant provides. Accordingly, using knowledge of the counterparty to offset QDM risk may not allow the full spectrum of trades that would be desirable to participants if trades could be performed anonymously at the same level of risk.

In various contexts, conflicts may occur in QDM systems that would be otherwise avoided in CLOB systems. The lack of a central sequencing order book creates situations in which multiple participants may attempt to trade at the same time. For example, multiple participants may attempt to trade with the same counterparty at the same time for the same underlying asset creating a conflict as to which of the participants should proceed first. Two participants may unknowingly initiate simultaneous trades matchable with each other causing cross-reservation of counterpart assets such that neither participant can proceed with the trade despite no conflicting trade existing. Network message transmission latency may create situations in which multiple participants take action in good faith without the possibility of having knowledge of an impending trade conflict. Thus, there is demand for technical solutions that resolve such conflicts in a speedy and equitable manner.

DETAILED DESCRIPTION

Conventional (QDM) system support liquidity consumer execution against quotes submitted by liquidity providers. However, such conventional systems do not provide a mechanism, i.e., communications channels, mechanisms to match orders, resolve priority, etc. for LC's execute trades with each other. Thus, such conventional QDM systems may prevent trading that would otherwise be desirable to the involved parties. For example, a provider-type participant in a QDM system may provide quotes that are viewed by consumer-type participants in an asymmetric relationship.

Figure 1:
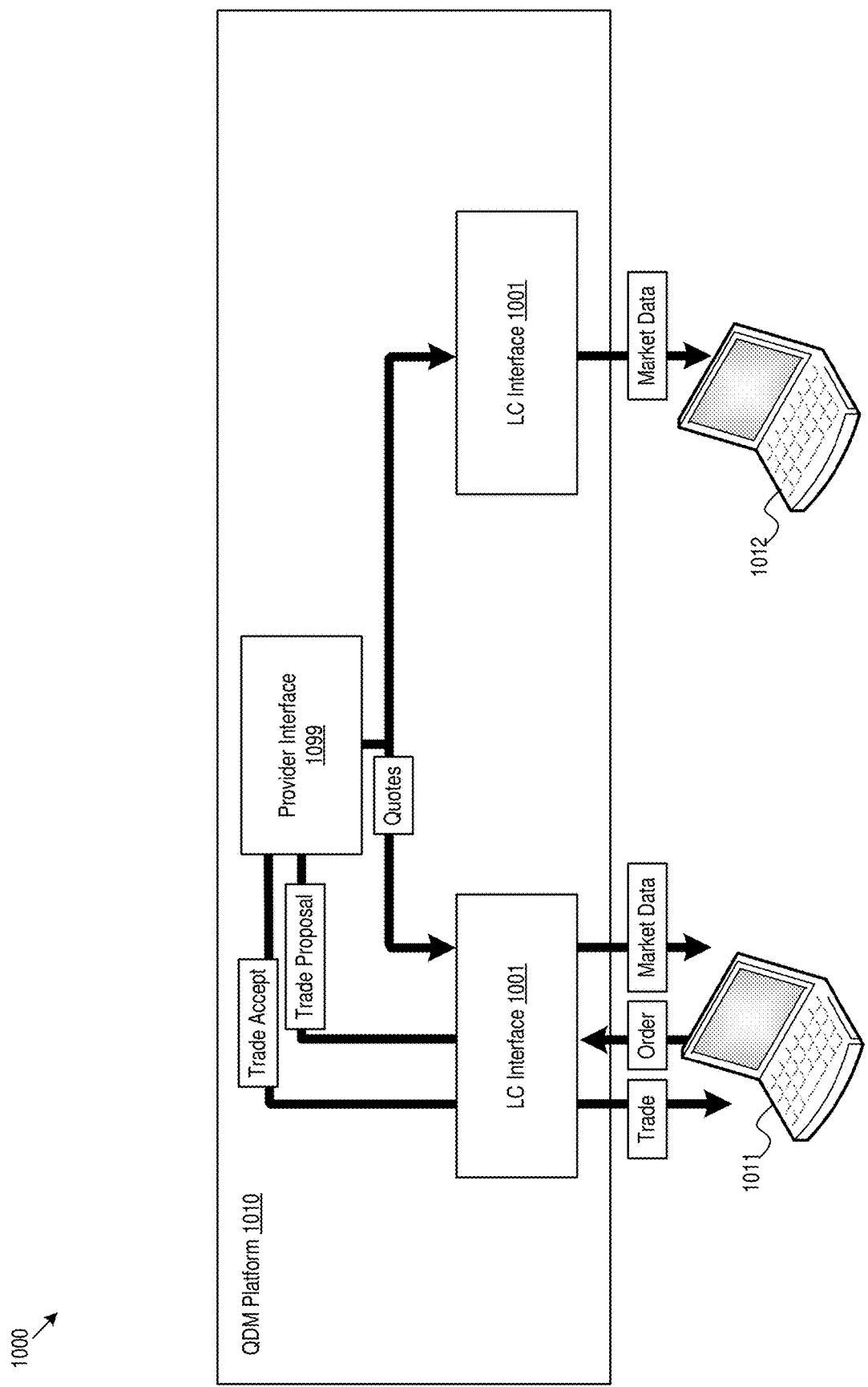
FIG. 1 shows an example provider-quote QDM system.

FIG. 1 shows an example provider-quote QDM system 1000. In the example provider-quote QDM system 1000, liquidity consumers (LCs) 1011, 1012 receive quotes from a provider interface 1099 within the QDM platform 1010. The LCs 1011, 1012 receive the quotes as market data from separate LC interface instances 1001 which maintain connections to the LCs 1011, 1012. The LCs 1011, 1012 may make orders which are translated to trade proposals by the LC interfaces 1001. The orders are based on the quotes/market data by the provider 1099. However, the LCs 1001, 1002 do not interact with one another via the QDM platform 1010.

The disclosed embodiments relate to systems/methods where QDM and/or other distributed execution model networks may implement resting orders submitted by a liquidity consumer (LC) to be published as market data to the community of LCs. Other LCs can then submit their own orders that can match with the resting orders, allowing for fast and deterministic execution for both LCs. Thus, the QDM-model may be implemented with peer-to-peer trading within a peer-to-peer execution venue. In various implementations, the peer-to-peer QDM platform may use a scalable architecture. Each consumer has a dedicated process, e.g., a dedicated processing instance. This scalable model is employed to allow consistently low latency at high throughput. The design prevents degradation of the performance of one consumer from the activities and load created by another consumer (e.g., consumers are isolated from one another at a server hardware level). In various contexts, the system provides distributed matching, over numerous (up to tens, hundreds, thousands, or more) matching engines cooperating to execute trades with strict order inventory management and orderly execution.

Thus, the disclosed embodiments provide a technical solution that allows a variety of peer-to-peer participant interactions not possible on conventional QDM systems.

Figure 2:
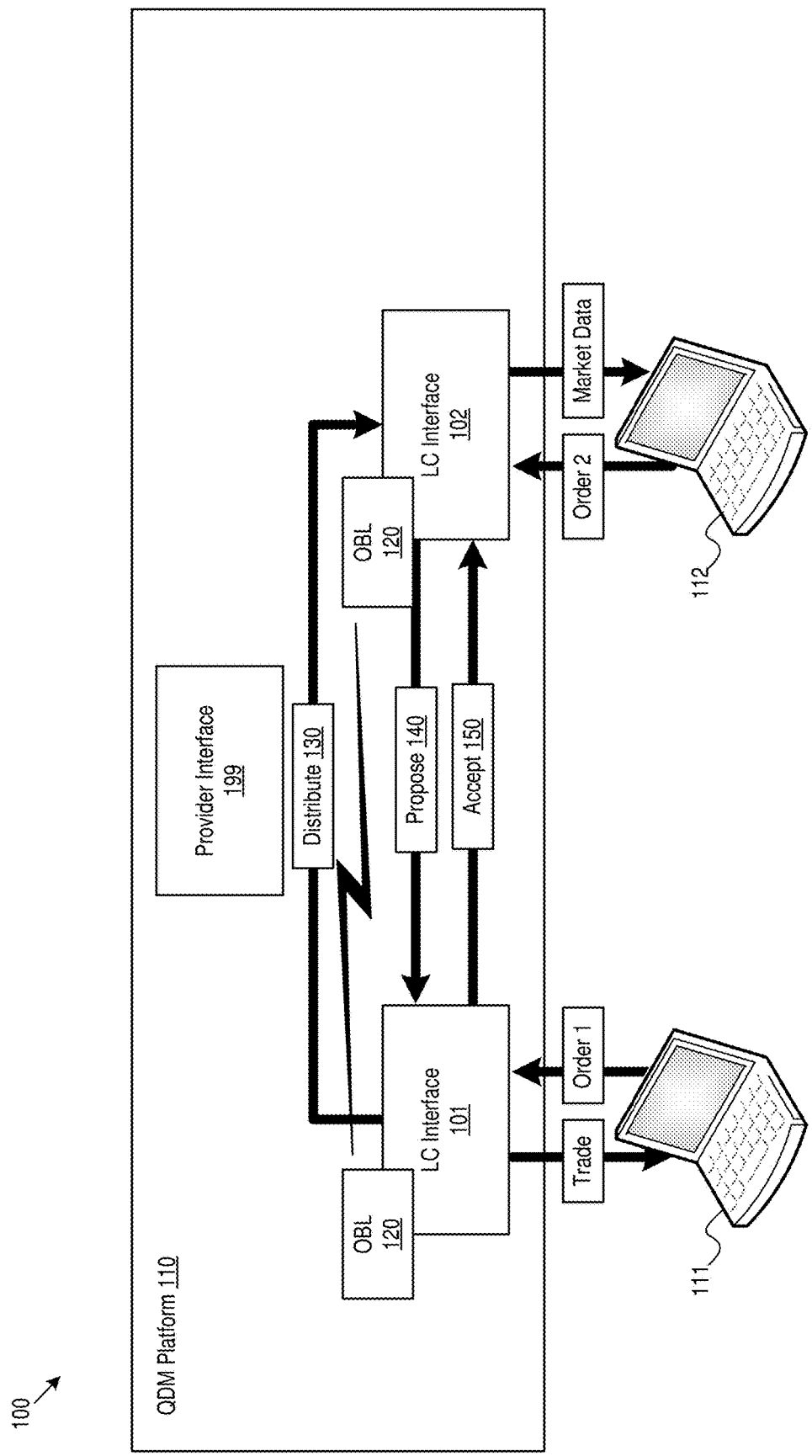
FIG. 2 shows an illustrative example liquidity consumer to liquidity consumer (LC-to-LC) exchange system.

FIG. 2 shows an illustrative example LC-to-LC exchange system 1000. In the illustrative example LC-to-LC exchange system 1000, two LC interfaces 101, 102, which serve respective participants 111, 112, within a QDM platform 1010 interact directly without necessarily relying on mediation by the provider interface 1099. As with other QDM systems, the provider (via the provider interface 1099 in this illustrative example) may provide quotes and/or other data messages to which the LC interfaces 1001, 1002 may request trades in response.

However, in this direct interaction illustrative example LC-to-LC exchange system 100, an LC 101 may determine to provide an unmatched order as a market data quote (e.g., a resting order) to the QDM platform 110. The market data is distributed 130 to the other LC interfaces. In the illustrative example LC-to-LC exchange system 100, a single Order Book Layer (OBL) 120, which reflects a complete snapshot of all available inventory at the LC Interfaces, is used. In various contexts, the use of a single OBL 120 may help to avoid overfilling a client order. Thus, each of the LC interfaces 101, 102 has a localized store of any resting order globally on the QDM platform 110, whether the quote originates from a provider interface or another LC interface. Using the localized store of the OBL 120, the other LC interface 102 may match new orders received from the respective participant 112 to resting orders. The LC interface 102 may determine propose a trade 140 on the resting order by the first LC interface 101. The proposal 130 may fully or partially fill the resting order by the first LC interface 101. The first LC interface 101 may receive the proposal and accept 150. The trade then executes.

As can be seen in FIG. 2, the progression of quote distribution 130, trade proposal 140, and trade acceptance 150 is handled through direct interaction of the LC interfaces 101, 102 without the provider interface 199 mediating. Nevertheless, in various implementations, the illustrative example LC-to-LC exchange system 100 may use broadcast transmission to effect the direct messaging of the LC interfaces 101, 102. Thus, the provider interface 199 may receive the messages for interaction.

Various ones of the disclosed embodiments employ chase logic to avoid trade conflicts arising out of simultaneous and/or near-simultaneous action by multiple consumers (or other QDM participants). For example, in cases where there are two resting orders and both get discovered simultaneously chase logic is used to determine which order is executed first. For example, if both LC interfaces 101, 102 placed matchable orders simultaneously and failed to find previous resting matches, 101, 102 may both generate matchable resting orders. The matchable resting orders may be discovered. Then both LC interfaces 101, 102 may act in concert issuing trade proposals and reserving their resting inventory of their own proposal. Chase logic may be implemented to cause one of the LC interfaces 101, 102 to backoff for a period while the other reissues a trade proposal. Thus, the backed-off LC interface is then ready to accept the trade proposal rather than being tied to its own proposal. Chase logic may use a chase protocol to determine which LC interface backs off and which LC interface proceeds with reissue.

The architectures and techniques discussed provide the technical solutions of a peer-to-peer network architecture (such as the illustrative example LC-to-LC exchange system 100 and the architectures discussed below) using dedicated processing instances to solve to the problem of disallowed direct exchanges on electronic trading platforms. Conventional systems rely on a provider-server-centralized interactions. Thus, conventional systems fail to recognize the technical problem of missing direct communication channels and direct exchange mechanisms. Rather, conventional systems lack support of consumer-to-consumer trades and the centralized organization of such systems provides only for approaches to reliant on provider system meditation. The peer-to-peer and/or distributed network architecture allows for technical solutions not possible on such conventional systems.

In various contexts, the dedicated processing instances, e.g., used to execute the dedicated LC interfaces and providers interfaces, provide a technical solution to the technical problem of processing latency generated by activity by a first participant degrading performance experienced by a second participant. Because peer-to-peer systems use distributed processing, resource sharing by participants may, in some cases, lead to uneven distributions of latency. For example, two participants at the same level of processing activity generation (e.g., the same trade number/volume or other activity level), may experience different levels of performance if each shares unreserved compute resources with another respective participant, where those respective resource-sharing participants have different activity levels. For example, a participant sharing resources with another very active participant may experience degradation greater than if that same participant where sharing resources with another inactive participant.

In centralized systems, such as ODM systems, all participants share a matching system. Thus, in centralized systems, all participants experience the same level of performance regardless of their relative levels of use. Accordingly, there is limited risk of uneven performance in centralized systems.

In peer-to-peer systems, a grouping of multiple participants (but less than all participants) on to shared resources may lead to uneven levels of latency that may, for at least some participants, be unconnected to their individual level of usage. Thus, various peer-to-peer architectures and techniques herein utilize dedicated processing instances for each participant to provide consistent compute performance for each participant—unaffected by the computational load generated by other participants.

To implement the peer-to-peer exchange systems with dedicated processing instances discussed herein a technical arrangement may be selected. Technical arrangements for an implementation may affect various technical implementation characteristics. For example, a technical arrangement may affect how, when, and what memory locations are accessed, which operations are performed on the data stored in those memory locations, the timing for the operations, and which order such operations are performed. The example technical arrangements for the peer-to-peer exchange systems discussed herein differ in that one relies on mirrored datastores to allow for complete access to market data individually at each of the dedicated processing instances; the other relies on compartmentalized datastores that allow for simplified security protocols when implementing data visibility controls and fewer security layers between the participant client terminal and the dedicated processing interface. Technical arrangements may affect operation efficiency, calculation accuracy, computational load, memory usage, and various other technical characteristics. Thus, technical arrangements further improve the operation of the underlying hardware.

Further, each specific technical arrangement details more than the already concrete, direct exchange interactions, peer-to-peer network architecture, and dedicated processing instances, for example, by the distribution and storage structure of information within dedicated processing instances. Selection among these example technical arrangements and others, is exclusively based on the technical considerations (e.g., processing power, system latency, system security architecture, and network data access timing, etc.) in addition to the separate technical question as to whether peer-to-peer exchange interactions should be supported within the system. Peer-to-peer exchange interactions may be deployed in a system independently of any particular technical arrangement, e.g., by peer-to-peer exchange interactions using another different technical arrangement that lacks the features of that particular technical arrangement.

Mirrored Datastore Arrangement—As an example of a technical arrangement for implementation of a peer-to-peer exchange system, market data within the market datastore portion of the data structure on the dedicated processing instance may be mirrored among the multiple instance. When using mirrored datastores, each individual dedicated processing instance may have access to identical and global market data for the peer-to-peer exchange system. As an illustrative example, a mirrored datastore technical arrangement is used to execute the single OBL of the LC-to-LC exchange system discussed above. Due to mirroring, the individual dedicated processing instances may execute a match engine locally without issuing data request to other instances, such as provider processing instance, during runtime of the match engine. The match engine locally has access to data available at others of the dedicated processing instances. Thus, requests for external match attempts or additional data to complete a matching process are obviated. Overfilling match errors are avoided because each individual dedicated processing instance has data even for orders involving participants without exchange relationships with the particular participant to which the dedicated processing instance is associated.

Compartmentalized Datastore Arrangement—As an example of a technical arrangement for implementation of a peer-to-peer exchange system, market data within the market datastore portion of the data structure on the dedicated processing instance may be compartmentalized. When using compartmentalized datastores, each individual dedicated processing instance may have access only to market data viewable by the participant to which the dedicated processing instance is assigned. Due to compartmentalization, any market data within the compartmentalized datastore may be accessed by the participant to which the dedicated processing instance is assigned. Thus, security layers between the participant terminal and the dedicated processing instance may be obviated, in some cases. In some implementations, this may allow low latency communication between the dedicated processing instance and the participant terminal. Additionally or alternatively, the dedicated processing instance may be moved outside of secure computing hardware, e.g., onto participant hardware itself.

To avoid overfilling match errors and/or gain access to match market data for which the participant lacks visibility, execution of the match engine may have an added layer performed outside the dedicated processing instance. Specifically, after a first match execution is completed on the dedicated processing instance with a compartmentalized datastore a confirmation match process in run on a global instance with additional market data. The confirmation match process confirms the validity of any match found by the dedicated processing instance (e.g., to avoid overfilling errors) and then runs an extended match to review market data not present on the compartmentalized datastore. Accordingly, the compartmentalized datastore arrangement may offer the technical benefits of decreased participant terminal to dedicated processing instance latency and simplified security architecture at the cost of additional match engine execution steps and increased exposure to shared computing resources (e.g., the global instance).

The trading environment to which the disclosed embodiments are applied may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g. that transactional integrity and predictable system responses are maintained. Electronic trading systems ideally attempt to offer an objective, efficient, fair and balanced market where market prices reflect a true consensus of the value of products traded among the market participants, where the intentional or unintentional influence of human interaction is minimized, if not eliminated, and where unfair or inequitable advantages with respect to information access are minimized if not eliminated.

A brief introduction to matching is now provided. Some products on an exchange are traded on an electronic trading platform (e.g., an electronic exchange), where market participants, e.g. traders, use software to send requests, e.g., quotes and/or trade proposals to the trading platform. The request identifies relevant product, the quantity of the product the trader wishes to trade, a price at which the trader wishes to trade the product, and a direction of the requested trade (e.g., whether the request is a bid, i.e., an offer to buy, or an ask, i.e., an offer to sell). Market data is monitored by participants, i.e., match or allocate, one or more previously received, but not yet matched, requests, i.e., limited requests to buy or sell a given quantity at a given price, referred to as "resting" quotes and/or converted market data, where each identified resting request is contra to the incoming order and has a favorable price relative to the incoming request. An incoming request may be an "aggressor", i.e., a request to sell a given quantity at whatever may be the resting bid order price(s) or a market order to buy a given quantity at whatever may be the resting ask order price(s). In particular, if the incoming request is a bid, i.e., an offer to buy, then the identified order(s) will be an ask, i.e., an offer to sell, at a price that is identical to or lower than the bid price. Similarly, if the incoming request is an ask, i.e., an offer to sell, the identified order(s) will be a bid, i.e., an order to buy, at a price that is identical to or higher than the offer price.

Upon submission of a request, the request may be vetted against any exchange relationship mappings and/or credit filtering to determine a potential matches. In some implementations, matches to the product/price/quantity may be found and then filtered for relationships and/or credit limits. The request then may be vetted against the market datastore of the dedicated processing instance to determine whether one or more suitable but not yet fully satisfied requests are present. Requests may be matched in this fashion until the incoming request is filled (using any applicable fill priority scheme) or some portion of the incoming request is found to be unmatched. The remaining portion of the request may be converted to market data for distribution to other instances and/or cancelled (depending on the failed-match preferences of the participant sending the request.

The disclosed systems and methods are compatible with any matching procedure or algorithm. Different products offered by a particular Exchange may use different matching algorithms. The manner in which orders are prioritized in the order book and/or allocated may thus vary. It will be appreciated that there may be other allocation algorithms, including combinations of algorithms, now available or later developed, which may be utilized in conjunction with the disclosed embodiments, and all such algorithms are contemplated herein.

Credit Filtering

A given credit limit is a quantity specified by a limit grantor, such as in millions or billions of units of credit limit currency, with respect to a grantee and numerically represents the level of risk that the grantor will accept with respect to the actions of the grantee. The aggregate utilization of a limit should not exceed that limit.

In an embodiment, credit control may be further used to facilitate market data filtering. In particular, as was noted above, traders may establish credit relationships, i.e., set credit limits, with other traders to enable trading therebetween. Where a trader does not wish to trade with another party they may not specify a limit or may specify a limit of zero, etc. Accordingly, each trader may be limited as to which other traders they may trade with.

As was noted elsewhere, as transactions are received, the electronic trading system may generate market data messages which are sent to the market participants and which contain data indicative of the result of those transactions. For incoming trade orders which are not completely satisfied by a previously received counter order, the market data message may serve to advertise the opportunity created thereby in order to solicit a suitable counter order from another trader.

As a given trader may not be able to enter into trades with all other traders, or may be limited as to particular instruments they are allowed to trade, etc., it may be useful to limit the information available to that trader, e.g., so that they are only able to access information regarding quotes, trades and/or counter parties that they allowed to transact with. With respect to credit limits, this may be referred to as credit filtering. Credit filtering may be performed for the convenience of the trader so as to limit the amount of irrelevant information that they must process, minimize the entry of improper orders, etc. Credit filtering may also be implemented so as to preserve confidentiality of information, e.g., such that information regarding the various credit relationships between parties may only be known by those parties.

Credit filtering may be implemented, generally, by filtering the market data messages before they are transmitted to the traders and/or by providing the unfiltered market data along with the filtering criteria to the traders such that their trading interface may implement the filtering. Filtering the outgoing market data messages may increase the computational burden on the electronic trading system but reduce the amount of data transmitted to the market participants and also prevent a given participant from receiving market data messages that should not have access to. Filtering at the trading interface may reduce the computational burden on the electronic trading system. More information regarding mechanisms for implementing credit filtering which may be implemented in conjunction with the disclosed demand based limit rebalancing may be found in U.S. patent application Ser. No. 17/154,265, as well as U.S. Pat. Nos. 5,375,055 and 10,692,143, both of which are herein incorporated by reference.

In either case, the filtering criteria, e.g., the current credit limits and/or available portions thereof, needs to be communicated from the credit control system, e.g., the credit control module 120, which may be referred to as the "leader component," to the filtering mechanism, e.g., the market data module 112, market data gateway, or to the trader client devices, which may be referred to as the "follower component," in a timely manner. As was noted above, credit utilization may be constantly changing as transactions are received and processed by the electronic trading system. Accordingly, as displayed to a trader on their trading system interface, the displayed credit information, or filtered result thereof, may not reflect the actual current utilization, e.g., the trader's display may show available credit when, in fact, a recent transaction, has consumed that available credit. In one embodiment, the disclosed system may tag the filter criteria, or any market data filtered based thereon with timing data indicating a time when the filter criteria was determined or otherwise indicate the latency or aging thereof relative to the information displayed on the trader's trading interface and/or a current time.

Matching/Allocation Algorithms

Although various ones of the peer-to-peer exchange systems use predefined rankings (e.g., rankings defined expressly in memory) for match priority, various additional implementations may optionally apply match algorithms. If the electronic trading system identifies that an incoming market request may be filled by a combination of multiple resting requests, e.g., the resting request at the best price only partially fills the incoming request, the exchange computer system may allocate the remaining quantity of the incoming, i.e., that which was not filled by the resting request at the best price, among such identified requests in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple requests contra to the incoming limit request and that have an identical price which is favorable to the price of the incoming request, i.e., the price is equal to or better, e.g., lower if the incoming request is a buy (or instruction to purchase) or higher if the incoming request is a sell (or instruction to relinquish), than the price of the incoming request, the exchange computer system may allocate the quantity of the incoming request among such identified requests in accordance with the matching algorithms as, for example, may be defined in the specification of the particular financial product or defined by the exchange for multiple financial products.

As was noted above, an exchange must respond to inputs, such as trader requests, cancellation, etc., in a manner as expected by the market participants, such as based on market data, e.g., prices, available counter-requests, etc., to provide an expected level of certainty that transactions will occur in a consistent and predictable manner and without unknown or unascertainable risks. Accordingly, the method by which incoming requests are matched with resting requests must be defined so that market participants have an expectation of what the result will be when they place a request or have resting requests and incoming request is received, even if the expected result is, in fact, at least partially unpredictable due to some component of the process being random or arbitrary or due to market participants having imperfect or less than all information. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified request sequentially in accordance with when the identified request was received. The quantity of the incoming request is matched to the quantity of the identified request at the best price received earliest, then quantities of the next earliest best price requests, and so on until the quantity of the incoming request is exhausted. Some product specifications define the use of a pro-rata matching algorithm, wherein a quantity of an incoming request is allocated to each of plurality of identified requests proportionally. Some exchange computer systems provide a priority to certain standing requests in particular markets. An example of such a request is the first request that improves a price (i.e., improves the market) for the product during a trading session. To be given priority, the trading platform may require that the quantity associated with the request is at least a minimum quantity. Further, some exchange computer systems cap the quantity of an incoming request that is allocated to a standing request on the basis of a priority for certain markets. In addition, some exchange computer systems may give a preference to requests submitted by a trader who is designated as a market maker for the product. Other exchange computer systems may use other criteria to determine whether requests submitted by a particular trader are given a preference. Typically, when the exchange computer system allocates a quantity of an incoming request to a plurality of identified requests at the same price, the trading host allocates a quantity of the incoming request to any requests that have been given priority. The exchange computer system thereafter allocates any remaining quantity of the incoming request to requests submitted by traders designated to have a preference, and then allocates any still remaining quantity of the incoming request using the FIFO or pro-rata algorithms. Pro-rata algorithms used in some markets may require that an allocation provided to a particular request in accordance with the pro-rata algorithm must meet at least a minimum allocation quantity. Any requests that do not meet or exceed the minimum allocation quantity are allocated to on a FIFO basis after the pro-rata allocation (if any quantity of the incoming request remains). More information regarding request allocation may be found in U.S. Pat. No. 7,853,499, the entirety of which is incorporated by reference herein and relied upon.

Other examples of matching algorithms which may be defined for allocation of requests of a particular financial product include:

Price Time
Request Level Pro Rata
Request Level Priority Pro Rata
Preference Price Time
Preference Request Level Pro Rata
Preference Request Level Priority Pro Rata
Threshold Pro-Rata
Priority Threshold Pro-Rata
Preference Threshold Pro-Rata
Priority Preference Threshold Pro-Rata Split Price-Time Pro-Rata For example, for the Price Time trading policy the request of traded volume allocation at a single price level may therefore be:

Request with oldest timestamp first. Followed by any remaining requests in timestamp sequence (First In, First Out—FIFO) next.

In Request Level Pro Rata, also referred to as Price Pro Rata, priority is given to requests at the best price (highest for a bid, lowest for an offer). If there are several requests at this best price, equal priority is given to every request at this price and incoming business is divided among these requests in proportion to their request size. The Pro Rata sequence of events is:

1. Extract all potential matching requests at best price from the market data into a list.

2. Sort the list by request size, largest request size first. If equal request sizes, oldest timestamp first. This is the matching list.

3. Find the 'Matching request size, which is the total size of all the requests in the matching list.

4. Find the 'tradable volume', which is the smallest of the matching volume and the volume left to trade on the incoming request.

5. Allocate volume to each request in the matching list in turn, starting at the beginning of the list. If all the tradable volume gets used up, requests near the end of the list may not get allocation.

6. The amount of volume to allocate to each request is given by the formula:

(Request volume/Matching volume)*Tradable volume

The result is rounded down (for example, 21.99999999 becomes 21) unless the result is less than 1, when it becomes 1.

7. If tradable volume remains when the last request in the list had been allocated to, return to step 3.

Note: The matching list is not re-sorted, even though the volume has changed. The request which originally had the largest volume is still at the beginning of the list.

8. If there is still volume left to trade on the incoming request, repeat the entire algorithm at the next price level.

Request Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching requests at best price from the market data into a list.

2. Sort the list by explicit time priority, oldest timestamp first. This is the matching list.

3. Find the 'Matching volume', which is the total volume of all the requests in the matching list.

4. Find the 'tradable volume', which is the smallest of the matching volume and the volume left to trade on the incoming request.

5. Allocate volume to each request in the matching list in turn, starting at the beginning of the list.

6. The amount of volume to allocate to each request is given by the formula:

(Request volume/Matching volume)*Tradable volume

The result is rounded down to the nearest lot (for example, 21.99999999 becomes 21) unless the result is less than the defined threshold in which case it is rounded down to 0.

7. If tradable volume remains when the last request in the list had been allocated to, the remaining volume is allocated in time priority to the matching list.

8. If there is still volume left to trade on the incoming request, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and maybe the entire incoming volume. The Price Time Volume is allocated to resting requests in strict time priority. Any remaining incoming volume after the Price Time Volume has been allocated will be allocated according to the respective Threshold Pro-Rata algorithm. The sequence of allocation, at each price level, is therefore:

1. Priority request, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting request may receive multiple allocations from the various stages of the algorithm.

It will be appreciated that there may be other allocation algorithms, including combinations of algorithms, now available or later developed, which may be utilized with the disclosed implementations, and all such algorithms are contemplated herein. In one implementation, the disclosed implementations may be used in any combination or sequence with the allocation algorithms described herein.

With respect to incoming requests, some traders, such as automated and/or algorithmic traders, attempt to respond to market events, such as to capitalize upon a mispriced resting request or other market inefficiency, as quickly as possible. This may result in penalizing the trader who makes an errant trade, or whose underlying trading motivations have changed, and who cannot otherwise modify or cancel their request faster than other traders can submit trades there against. It may considered that an electronic trading system that rewards the trader who submits their request first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting requests, allocation/matching suitable resting requests to match against an incoming request can be performed, as described above, in many different ways. Generally, it will be appreciated that allocation/matching algorithms are only needed when the incoming request quantity is less than the total quantity of the suitable resting requests as, only in this situation, is it necessary to decide which resting request(s) will not be fully satisfied, which trader(s) will not get their requests filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the requests received for a particular financial product to dictate how the entire quantity of the incoming request is to be matched/allocated. In contrast, the disclosed implementations may apply different matching algorithms, singular or combined, to different requests, as will be described, recognizing that the allocation algorithms used by the trading host for a particular market may, for example, affect the liquidity of the market. Specifically, some allocation algorithms may encourage traders to submit more requests, where each request is relatively small, while other allocation algorithms encourage traders to submit larger requests. Other allocation algorithms may encourage a trader to use an electronic trading system that can monitor market activity and submit requests on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place a request at a particular price and maintains this reward indefinitely. So if a trader is the first to place a request at price X, no matter how long that request rests and no matter how many requests may follow at the same price, as soon as a suitable incoming request is received, that first trader will be matched first. This "first mover" system may commit other traders to positions in the queue after the first move traders. Furthermore, while it may be beneficial to give priority to a trader who is first to place a request at a given price because that trader is, in effect, taking a risk, the longer that the trader's request rests, the less beneficial it may be. For instance, it could deter other traders from adding liquidity to the marketplace at that price because they know the first mover (and potentially others) already occupies the front of the queue.

With a pro rata allocation, incoming requests are effectively split among suitable resting requests. This provides a sense of fairness in that everyone may get some of their request filled. However, a trader who took a risk by being first to place a request (a "market turning" request) at a price may end up having to share an incoming request with a much later submitted request. Furthermore, as a pro rata allocation distributes the incoming request according to a proportion based on the resting request quantities, traders may place requests for large quantities, which they are willing to trade but may not necessarily want to trade, in request to increase the proportion of an incoming request that they will receive. This results in an escalation of quantities of resting requests and exposes a trader to a risk that someone may trade against one of these requests and subject the trader to a larger trade than they intended. In the typical case, once an incoming request is allocated against these large resting requests, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming request may be allocated using a FIFO mechanism with the remainder being allocated pro rata.

Figure 3:
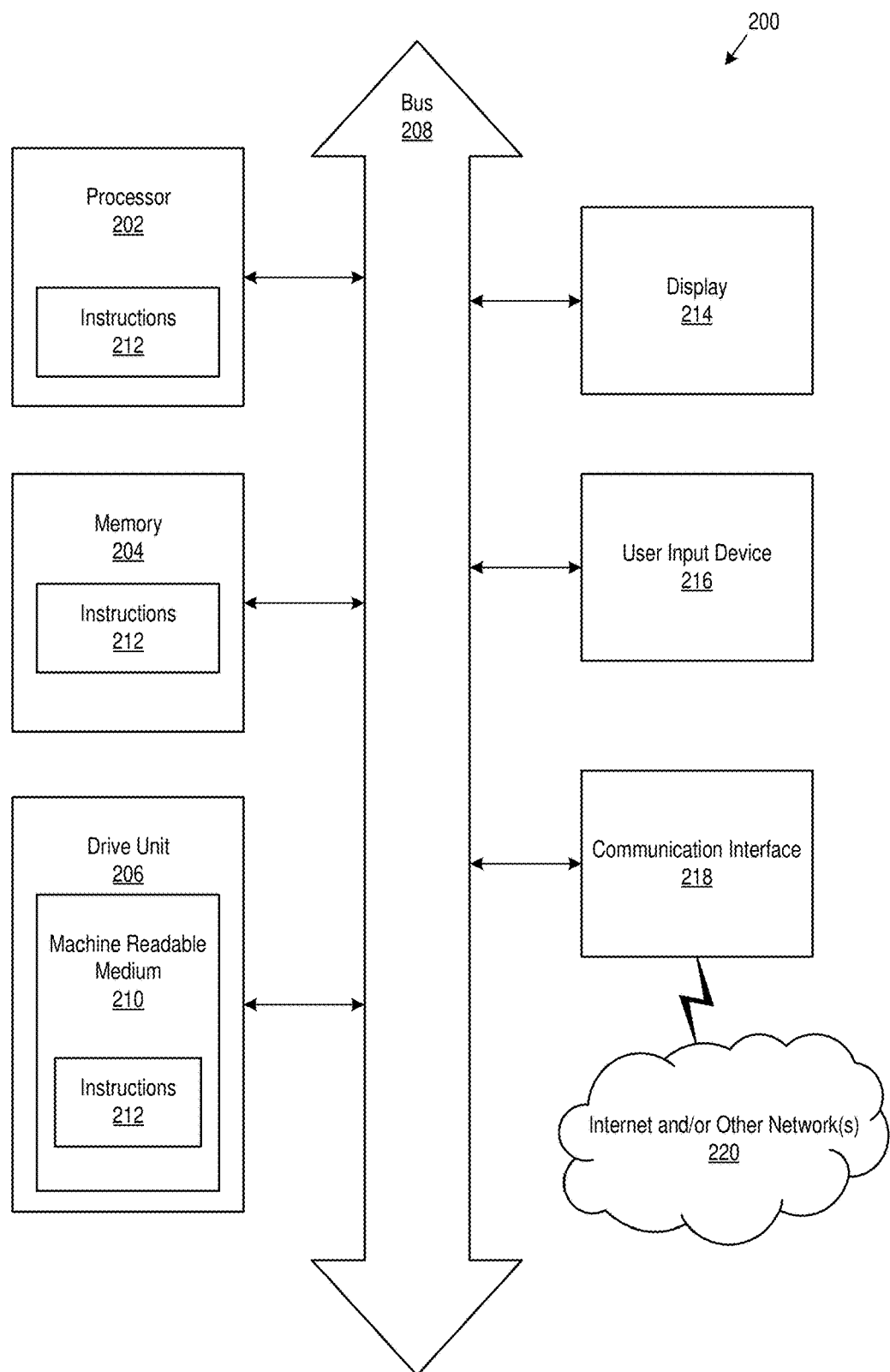
FIG. 3 shows an illustrative embodiment of a general computer system for use in or with the examples of FIGS. 2, 4 and 5.

Referring to FIG. 3, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above may be a computer system 200 or a component in the computer system 200. The computer system 200 may implement a match engine on behalf of an exchange, such as the Chicago Mercantile Exchange, of which the disclosed embodiments are a component thereof. The computer system of FIG. 3 may be implemented to execute one or more dedicated processing instances within the peer-to-peer exchange system, as discussed below.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 3, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate with a drive unit 206 and other components of the system 200 via a bus 208. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 204 is operable to store instructions 210 executable by the processor 202. The functions, acts or tasks illustrated in the figures or described herein may be performed by the programmed processor 202 executing the instructions 210 stored in the memory 204. The instructions 210 may be loaded or accessed from a computer-readable storage medium 212 in the drive unit 206 or other data storage device. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 212, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 3, the computer system 200 may also include an optical or other disk drive unit as the drive unit 206. The disk drive unit 206 may include the computer-readable storage medium 212 in which one or more sets of instructions 210, e.g. software, can be embedded. Further, the instructions 210 may embody one or more of the methods or logic as described herein. In a particular embodiment, the instructions 210 may reside completely, or at least partially, within the memory 204 and/or within the processor 202 during execution by the computer system 200. The memory 204 and the processor 202 also may include computer-readable storage media as discussed above.

The present disclosure contemplates a computer-readable medium that includes instructions 210 or receives and executes instructions 210 responsive to a propagated signal, which may be received via a communication interface 218. The system 200 may be connected to a network 220 to communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to TCP/IP based networking protocols.

Peer-To-Peer Exchange

Figure 4:
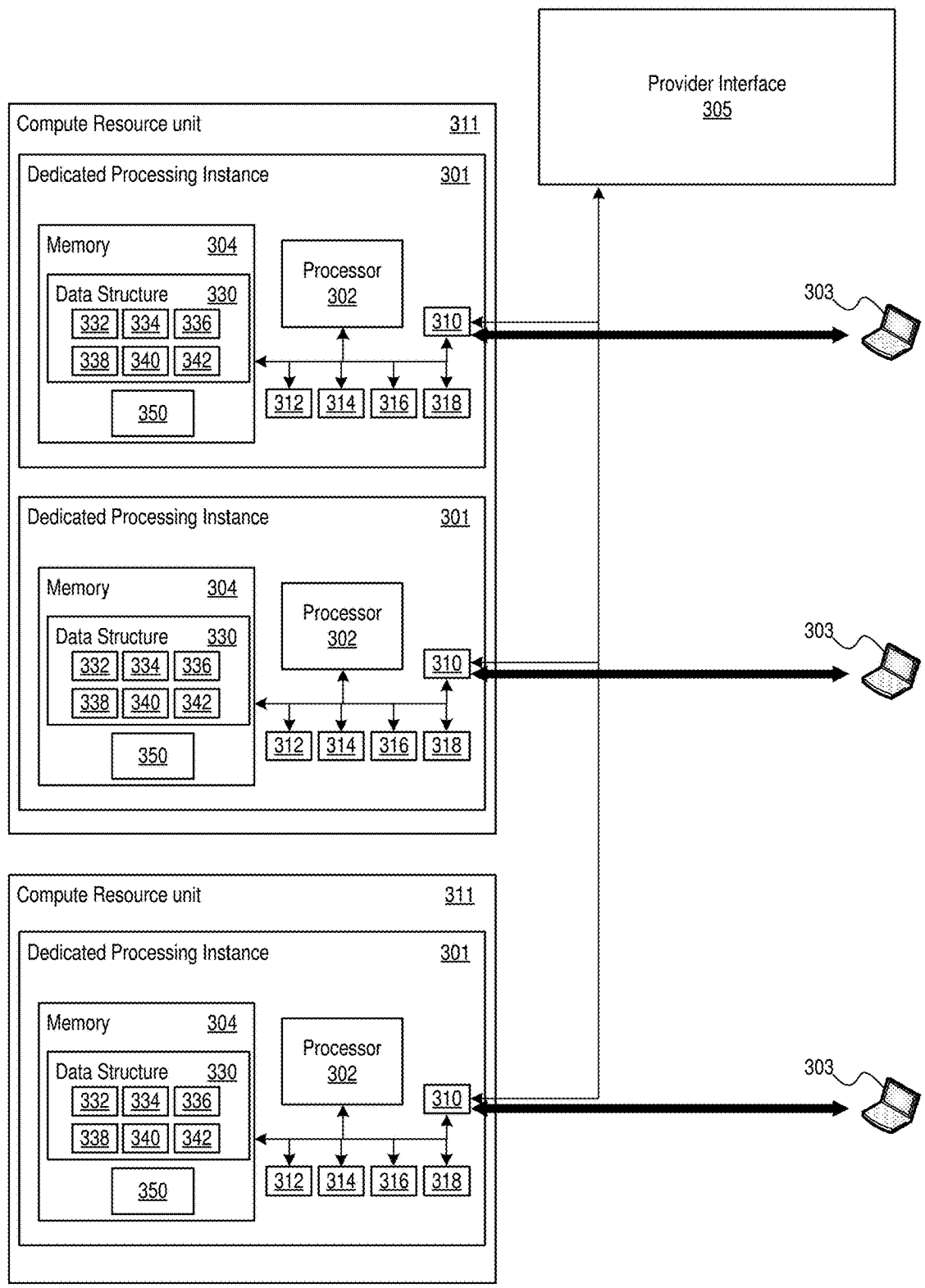
FIG. 4 is a block diagram of an example peer-to-peer exchange system according to various embodiments.

FIG. 4 depicts a block diagram of a peer-to-peer exchange system 300 for data message matching, each data message characterized by an associated transactional value. More particularly, the peer-to-peer exchange system 300 implements data message matching and handling among a plurality dedicated processing instances 301 executing on compute resource units 311 which may be geographically and/or logically distributed. Each individual dedicated processing may implement an individual dedicated match processing engine 312. Each of the dedicated processing instances includes a processor 302, which may be a granted portion of the one or more hardware processors' computing cycles from the compute resource unit 311. The processing instances 301 may further interact with a provider interface 305. The reservation may include virtual-machine-like express reservation of specific hardware resources, cloud-type hardware equivalent reservation, application-centric serverless reservation (which may implicitly reserve compute resources), one-to-one correspondence between the dedicated processing instances 301 and the compute units 312, and/or a cap on the number of allowed instances on a single compute unit having defined hardware resources. Each of the processing instances has specifically assigned non-transitory memory 304 coupled therewith, such as the processor 202, memory 204, described in detail above with reference to FIG. 3.

Each dedicated processing instance 301 may, e.g., using the processor 302, execute an exchange interface 310 for interaction with participants, e.g., to receive data messages, e.g., including trade quotes, proposals, and/or other requests from the participant and provide, e.g., via generation of user interface windows at a terminal device 303 of the participant, displays of market data to the participant. The received data messages may include requests for trades desired products, quantities, prices, and indications of directionality. The exchange interface 310 may further receive market data messages to maintain the market datastore 334, discussed below. Market data messages may include quotes generated from unmatched data messages from other participant that have been converted to market data after match failure. The market data messages also may include indications of matched messages to cancel resting messages and/or other messages to update inventory status for resting messages, provider quotes, and/or other market status updates.

In various implementations, the exchange interface 310 may transmit messages using broadcast messaging. Broadcast may transmit a copy of any sent message globally to the dedicated instances 301 on the peer-to-peer exchange system. In other words, messages may be globally distributed. In some implementations, the exchange interface 310 may use broadcast multicasting to effect point-to-point communications. In other words, messages directed to only a single recipient may be transmitted using broadcast messaging. Broadcast messaging simplifies message routing within the peer-to-peer exchange system and allows for system scalability without reconfiguration. New instances need only an identifier rather than a routing address. Additionally or alternatively, broadcast messaging, in mirrored market datastore arrangements, allows the disparate instances to mirror market data by monitoring broadcast messages rather than requesting updates from other instances or relying specific update messages to circulate. Broadcast messaging may ensure data has real-time mirrored status (rather than a refresh delay).

The dedicated processing instances 301 may maintain a data structure 330 on the memory 304. The data structure 330 may include an exchange relationship mapping 332, a market datastore 334, credit parameters 336, a visibility profile 338, and/or match-failure market data conversion preferences 340.

The exchange relationship mapping 332 may include indications of whether particular participant has trading relationships with other participants and/or providers within the peer-to-peer network. In various implementations, a global exchange relationship mapping 332 may be stored in the memory 304 of one or more dedicated processing instances 301. A global exchange relationship mapping may store indications of relationship status for each participant/provider within the peer-to-peer exchange system. In some implementations, a participant-specific relationship mapping may be used. A participant-specific relationship mapping may include relationships for a specific participant (e.g., the participant to which the dedicated processing instance is assigned) and exclude relationships not involving that participant. A participant-specific relationship mapping reduces the total data stored with the memory 304 relative to that used by a global exchange relationship mapping. Further, because the dedicated processing instance does not search (or filter searches) for participants to which the instance is not assigned, the instance may not necessarily have need to access relationships for the non-assigned participants. The dedicated processing instance may instead rely on mirrored market data from other instances to update inventory (e.g., for mirror market datastore technical arrangements).

In various implementations, the exchange relationships may be based on participant history. For example, relationships may be created (or suggested to participants for creation based on a historical analysis of prior exchanges showing a selected level of compatibility (e.g., a portion of exchanges that would have matched if a relationship were present) and/or indications of balanced benefit. For example, the exchanges that would have occurred would have had similar ratios of profit and loss (or other benefit quantizations).

For existing relationships, mutual history between participants may be used to identify benefit asymmetry between participants. For example, a benefit asymmetry may occur due to a history of multiple exchanges between the same two participants where a one participant benefited from an exchange while the other did not. For example, one participant may profit in several exchanges where the other participant experiences losses. A benefit asymmetry may cause the system to end a particular relationship. In some cases, asymmetries may be based on absolute benefit ratios (e.g., without consideration of the number of exchanges involved). In some cases, a history of multiple exchanges may be considered to avoid cancellation of a relationship based on a single one or small number of unbalanced exchanges).

The market datastore 334 may include market data such as quotes generated from unmatched data messages from other participant that have been converted to market data after match failure. The market data may inventory status for resting messages, provider quotes, price information, trading directionality indicators, and/or data to support exchange operations. As discussed above with respect to the technical arrangements, the market datastore may include a mirrored market datastore with mirrored globally distributed market data in a mirrored market datastore 334. Because, in some implementations, the exchange relationship mapping 332 may be participant specific, the data structure 330 may be a specialized data structure with mirrored and compartmentalized portions. Thus, the data structure may not only provide hardware improving data architecture, but also provide specialized data structure sector-wise data security.

In a compartmentalized market datastore arrangement, the data in the market datastore may be determined based on visibility by the assigned participant. Data not visible by the assigned participant may be omitted from the compartmentalized market datastore.

Credit parameters 336 may include particular credit levels, threshold, and preferences of different participants. Credit filtering, which may be performed by the filter engine 314, may rely on the levels, limits, and preferences defined within the credit parameters 336 of the data structure 330.

The visibility profile 338 may indicate which data on the data structure 330 may be viewed by/shared with the assigned participant for the dedicated processing instance 301. In some cases, a first participant may elect to have an exchange relationship (e.g., allowing exchanges) with a second participant. Nevertheless, the first participant, e.g., a visibility-control participant, may elect to shield their market data from the second participant's view. In other words, the first participant may be amenable to incidental trading with the second participant, but not be amenable to the second participant being able to track and aggress upon the market data of the first participant.

The visibility profile 338 may control whether market data is anonymized, pseudonymized, or associated with a real name. In some implementations, the peer-to-peer system may have a global procedure. For example, market data may be globally pseudonymized for presentation to allow tracking within the peer-to-peer exchange system 300 but prevent association of participants with real world entities outside of the peer-to-peer exchange system 300. In other implementations, a default may be used, but the visibility profile may override the default. For example, market data may default to pseudonymous presentation, but participants may elect to associate their market data with their real name and/or anonymize presentation of their market data to prevent tracking even within the peer-to-peer exchange system 300. In some cases, visibility may be symmetric, e.g., if a first participant limits visibility of their data to a second participant, data from the second participant is limited for the first. The highest mutual level of allowed visibility may be applied in both directions. In other implementations, asymmetric visibility may be permitted (e.g., based on the individual elections by participants).

The visibility profile 338 may control the visibility of data. In some cases, data may be stored in a more complete form than is visible. For example, among data processing instances 301 market data may be pseudonymized at minimum in some implementations. Thus, tracking by the peer-to-peer exchange system itself may be possible even when data presented to participants may be anonymized. Thus, visibility may be different from data compartmentalization, which may include storing the data in the same form in which it can be viewed.

Match-failure market data preferences 340 may include preferences by the participant as to the conditions for converting data messages from that participant into resting market data that can be matched by later incoming data messages from other participants. For example, a match-failure market data preference may include minimum or maximum quantities for conversion. Preferences may exclude partially match data messages from having a remaining quantity converted. Conversely, full-unmatched data message may be excluded. A maximum market data generation refresh rate may be enforced. For example, unmatched data messages over a refresh period may be netted before "digest" market data is generated. In some case, conversion preferences may be binary. In other words, all unmatched messages are converted, or no unmatched messages are converted. The dedicated processing instances may be configured to support/allow some preference types while disallowing (or not supporting) other preference types.

The chase protocol 342 may include parameters and definitions for executing chase logic 318 discussed below. The chase protocol 342 may define how the dedicated processing instance arbitrates a chase occurrences where two competing data messages attempt to exchange with the same resting data message, including the special, but not uncommon, case where the two messages "chase" one another. The chase protocol 342 may define backoff priority which may detail how the instances determine which of the instances backs off. In some implementations, backoff priority may be determined deterministically. For example, an explicit ranking or instances may be defined within the chase protocol 342. For example, one or more conditions for determining backoff priority may be defined. For example, a "senior" data message (e.g., with the slightly older timestamp but still within a period defined as simultaneous) may be executed first causing other messages to be backed off. Various other priority schemes may be used. In some implementations, a randomized priority may be used. For example, the instances may generate random numbers and proceed in order (e.g., from lowest to highest, or vice versa)

The chase protocol 342 may further define how the length of the backoff delay is determined. In some implementations, a deterministic delay length may be used. For example, a set backoff delay length may be defined within the chase protocol 342. For example, the backoff delay may be defined in terms of a multiple of an average execution time for exchanges within the peer-to-peer exchange system. In some implementations, a randomized backoff delay may be used. For example, a randomly generated number within a defined range may be added to a minimum delay amount to determine the backoff length.

In various implementations, various non-deterministic schemes may be used to generate randomized values. For example, random or pseudorandom number generators may be used. Other stochastic number generation schemes may be used in some cases.

The dedicated processing instances 301 may further execute a match engine 312 on the processor 302. The match engine 312 may attempt to match received data messages from the participant with data messages of other participants (e.g., previously converted to market data) and/or providers. The match engine may compare data message parameters such as price, quantity, and directionality to match incoming messages with resting market data. The match engine may generate a listing of suitable messages that could result in an exchange with the incoming data message.

Various match algorithms may be used those discussed above with regard to the match/allocation algorithm section.

In some cases, where multiple resting messages could be matched but not all identified resting messages can be filled by the incoming data message, a fill priority algorithm may be used to determine which of the multiple resting messages are to be filled or partially filled. Various allocation algorithms may be used those discussed above with regard to the match/allocation algorithm section.

In various implementations, various types of resting data messages may have different requirements. For example, providers may be required to provide firm quotes for which the provider will accept any proposal meeting the conditions (including credit and relationship conditions) of the quote. Accordingly, fill priority and/or match priority may also take into account acceptance conditions. For example, non-firm quotes may be prioritized to encourage participants to clear non-firm resting messages before they become stale. Moreover, prioritizing participant quotes may result in more overall satisfaction because participant-to-participant exchanges allow two participants to make an exchange instead of only one. In some cases, firm quotes may be prioritized to obtain lower latency trading performance.

In various implementations, to execute the match and fill priorities, the match engine 312 may generate a ranked match data structure 350 within the memory 304. The ranked match data structure may include a specialized data structure in which an express ordering is applied to each entry. Thus, interchanging any two entries changes the functional result of application of the data structure. Thus, the entries in the ranked match data structure may be executed in the order in which they appear without referencing an additional rank field, reducing the processing load associated with execution of a ranked match prioritization. Accordingly, the structure of the ranked match data structure 350 specifically controls and improves the operation of the underlying processing hardware at a fundamental level dealing with both storage architecture and base-level computer processing.

The dedicated processing instances 301 may further execute a filter engine 314 on the processor 302. The filter engine 314 may operate in coordination with the match engine 312 to determine data message matching. The filter engine 314 may access the exchange relationship mapping 332 and/or the credit parameters 336 to filter resting messages for which relationship and/or credit conditions are not met.

For example, the filter engine 314 may, for a data message from a first participant, exclude messages from any participant for which no exchange relationship exists with the first participant. In other words, the filter engine 314 excludes blocked participants which lack an exchange relationship and allows relationship participants that have an exchange relationship. From the messages associated with relationship participants, the filter engine 314 may filter message for which credit parameters are not met. For example, the first participant may not currently meet specific credit requirements of various ones of the relationship participants. Conversely, various ones of the relationship participants may not meet the current credit requirements of the first participant. In some cases, the execution of the data message may be taken into account. For example, the filter engine 314 may prospectively execute the exchange that would occur if the data message was matched, if the execution of the exchange would cause credit thresholds to be exceeded, e.g., for credit-threshold participant, the matches that would cause the threshold crossings may also be filtered. In some case, such credit-threshold filtering may cause a messages that would otherwise be fully matched to be left at least partially unmatched.

Various other credit filtering techniques (such as those discussed above with respect to the credit filtering section) may be used.

Filtering may occur prior to or after the match engine 312 searches for suitable resting messages. In some cases, filtering may be divided such that relationship filtering occurs prior to the search while credit filtering occurs at least in part after the search. For example, credit filtering may occur entirely after the match engine search. In an example, credit filtering at the participant credit level may occur prior to the match engine search, while credit filtering based on prospective execution occurs after the search. Other schemes may be used.

After match and filtering, a data message may be at least partially unmatched. The dedicated processing instances 301 may execute a message handler 316 on the processor 302 that may access the match-failure market data preferences 340 on the data structure 330 to determine whether unmatched message meets the conditions for market data conversion. When the conditions are met, the unmatched message is converted to a market data message which may specify the parameters for the remaining unmatched portion. Parameters such as quantity may be reduced relative to original data message if partially matched. The message handler 316 then provides the converted market data message to the exchange interface 310 for distribution to the other instances within the peer-to-peer exchange system 300. When conditions are not met for conversion to market data, the remaining portion of the data message is cancelled, and no resting market data is generated.

In various implementations, the dedicated processing interfaces may execute chase logic 318 to resolve chase occurrences. The chase logic 318 using the chase protocol 342 may be analogous to contention arbitration in computer networks. The chase logic 318 may determine a backoff priority for the dedicated processing instance based on the chase protocol 342 within the data structure 330. After the determining the backoff priority, the chase logic may cause the exchange interface 310 to immediately reissue the data message that initiated the chase logic, if the chase logic 318 determines that the instance has the highest priority.

If the chase logic determines that the priority for the dedicated processing instance is other than the highest, the chase logic 318 may execute a backoff delay. The chase logic 318 may determine the backoff delay length in accord with the chase protocol, as discussed above.

The exchange interface 310, match engine 312, filter engine 314, the message handler 316, and/or the chase logic 318 may be computer executable program code stored in the memory 304, implemented as a separate component or as one or more logic components, such as on an FPGA which may include a memory or reconfigurable component to store logic and a processing component to execute the stored logic, or as first and second logic respectively, e.g. computer program logic, stored in a memory, such as the memory 204 shown in FIG. 3 and described in more detail above with respect thereto, or other non-transitory computer readable medium, and executable by a processor 302, such as the processor 204 shown in FIG. 3 and described in more detail above with respect thereto, to cause the processor 302 to, or otherwise be operative as described.

Figure 5:
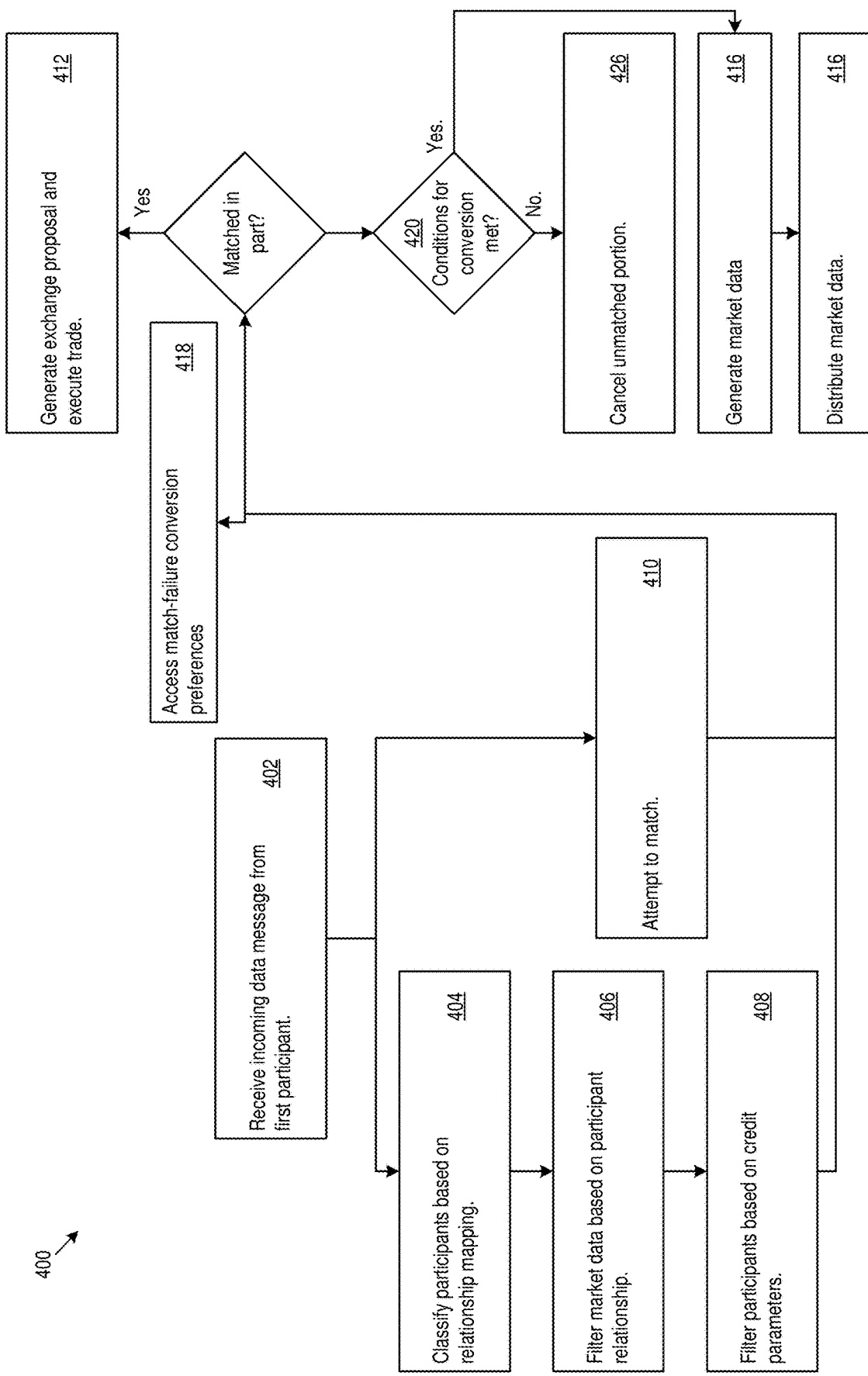
FIG. 5 is a flow diagram depicting operation of the system of FIG. 4.

FIG. 5 depicts a flow chart showing operation of the system 300 of FIG. 4. In particular FIG. 5 shows a method, which may be computer implemented, for matching data messages in a peer-to-peer exchange network.

At block 402, the data processing instance 301 may receive a data message from a first participant at the exchange interface 310. The data message may originate from a terminal 303 of the first participant.

At block 404, the data processing instance 301 may implement the filter engine 314 to access the exchange relationship mapping 332 within the data structure 330 to determine classify other participants as relationship participants or blocked participants.

At block 406, the filter engine 324 may filter market data in the market datastore 334 according to the classification of participants as blocked participants or relationship participants.

At block 408, the filter engine 314 may further access the credit parameters 336 and further apply credit filtering the market data.

At block 410, the data processing instance 301 may apply the match engine 312 to attempt to match the data message to one or more resting messages previously converted to market data by one or more of the relationship participants and/or or provider messages within the market data.

At block 412, the exchange interface 310 may send one or more trade proposal in response to an at least partial match with a relationship participant and/or provider. The exchange interface 310 may receive a trade acceptance (or rejection) in response to the trade proposal. After the response, the exchange interface may send market data, e.g., which may be generated by the message handler 316, indicating updates reflecting the execution (or non-execution) of the exchange for the at least partial match.

At block 418, the market data handler 316 may access the match-failure market data preferences 340 for the first participant. At block 420, the market data handler 316 may, in response to an at least partial match failure, determine whether the data message meets the conditions for match-failure market data conversion, e.g., specified within the match-failure market data preferences 340.

At block 422, when conditions are met, the market data handler 316 may convert the remaining unmatched portion of the data message to market data to generate updated market data including a new resting data message. At block 424, the exchange interface 310 may distribute (e.g., globally distribute through broadcast messaging) the updated market data.

At block 426, when conditions for conversion are not met, the remaining unmatched portion of the data message is cancelled by the market data handler 316. The exchange interface may distribute updated market data indicating the at least partial cancellation.

The order of the acts or steps of the operation may vary from the example shown. For example, the filtering by the filter engine may occur after or before the search by the match engine. Additional, fewer, or alternative acts may be implemented. For example, the method may include an additional allocation adjustment procedure for credit e.g., when the credit state of particular participants may be affected by market activity outside of the peer-to-peer exchange network. In some implementations, particular market data updates may be obviated. For example, a market data updates expressly cancelling an unmatched portion may be unneeded in systems that assume cancellation in the absence of a market data update expressly creating a resting data message corresponding to the unmatched portion. Moreover, various messages may be combined. Partial cancellations may be included in updates with partial matches. New resting messages corresponding to partially unmatched portions may be included in market data updates regarding the matched portions.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the terms "computer-readable medium" and "computer-readable storage medium" include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable storage medium may be or include a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an example, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

TABLE 1 includes various examples.
Examples

1. A computer-implemented method of data message matching in a peer-to-peer system, the method including:
receiving, by a processor and from a first participant, a current data message at a dedicated processing instance for the first participant, the dedicated processing instance for the first participant including dedicated compute resources for match operations specific to the first participant;
accessing, in a data structure at the dedicated processing interface, a participant-specific exchange relationship mapping;
determining, by the processor and based on the participant-specific exchange relationship mapping, that the first participant has an exchange relationship with one or more relationship participants;
determining, by the processor and based on the participant-specific exchange relationship mapping, that the first participant lacks an exchange relationship with one or more blocked participants;
attempting to match, using a mirrored market datastore of the data structure at the dedicated processing interface and without attempting to match to data messages associated with the one or more blocked participants, the current data message to one or more provider data messages from a first provider and/or one or more previous participant data messages associated with corresponding ones of the one or more relationship participants having an exchange relationship with the first participant, the one or more previous participant data messages converted to market data based on match-failure market data conversion preferences by the corresponding ones of the one or more relationship participants, the mirrored market datastore including global market data mirrored across the peer-to-peer system;
determining, by the processor at the dedicated processing interface, whether the first participant has a match-failure market data conversion preference for the current data message;
at a time the attempt to match fails at least in part and the first participant has a match-failure market data conversion preference for the current data message:
converting, by the processor, the current data message to updated market data; and
globally broadcasting the updated market data from the dedicated processing instance to other dedicated processing instances for other participants in the peer-to-peer system, the other participants in the peer-to-peer system including both the relationship participants and the one or more blocked participants; and
cancelling, at a time the attempt to match fails and the first participant lacks a match-failure market data conversion preference for the current data message, the current data message without distribution to the other dedicated processing instances.

TABLE 1-continued includes various examples.
Examples

2. The computer-implemented method of example 1 or any other example in this table, further including maintaining a mirrored state of the mirrored market datastore by receiving, at the dedicated processing instance for the first participant, globally broadcast data messages from dedicated processing instances for other participants in the peer-to-peer system.

3. The computer-implemented method of example 1 or any other example in this table, further including receiving a peer-to-peer message by receiving, at the dedicated processing instance for the first participant, a globally broadcast data message from a specific one of the dedicated processing instances for other participants, the globally broadcast data message including the peer-to-peer message, the peer-to-peer message directed from a specific one of the dedicated processing instances for other participants individually to the first participant.

4. The computer-implemented method of example 1 or any other example in this table, wherein the participant-specific exchange relationship mapping excludes relationship details for participant relationships within the peer-to-peer system that do not include the first participant.

5. The computer-implemented method of example 1 or any other example in this table, wherein:
the data structure of the dedicated processing instance for the first participant further includes a visibility profile for the mirrored market datastore;
the method further includes:
receiving, at the dedicated processing instance for the first participant, a request from a client interface of the first participant to view market data within the mirrored market datastore; and
determining, by the processor and based on the visibility profile, to exclude the market data for a matchable message associated with a visibility-control participant, the visibility-control participant having an exchange relationship with the first participant, the visibility-control participant denying visibility of the market data for the matchable message for the first participant.

6. The computer-implemented method of example 1 or any other example in this table, wherein the dedicated processing instance for the first participant is hosted on a compute resource unit, the dedicated compute resources maintained by capping an allowed number of dedicated processing instances hosted on the compute resource unit.

7. The computer-implemented method of example 6 or any other example in this table, wherein the compute resource unit includes:
a cloud server;
a serverless compute reservation;
a virtual machine; and/or
a computer node within a distributed ledger network.

8. The computer-implemented method of example 1 or any other example in this table, wherein:
attempting to match the current data message includes:
first determining, by the processor and based on credit threshold data within the data structure of the dedicated processing instance for the first participant, that fully matching the current data message with an otherwise fully matchable data message results in a credit threshold being exceeded for a credit-threshold participant of the relationship participants; and
second determining, by the processor and based on the first determining, to partially fail to match the current data message.

9. The computer-implemented method of example 1 or any other example in this table, further including:
receiving, by the processor, incoming market data for an unmatched data message from one of the other dedicated processing instances for other participants in the peer-to-peer system; and
pseudonymizing, by the processer, the incoming market data by storing the incoming market data within the mirrored market datastore using a pseudonymous identifier for the one of the other dedicated processing instances for other participants in the peer-to-peer system.

10. The computer-implemented method of example 1 or any other example in this table, further including:
generating, at a time that the attempt to match at least in part succeeds, an exchange request data message for a matched data message matched to the current data message; and
receiving, prior to completion of a match exchange based on the matched data message, chase market data including a request for a competing exchange associated with the matched data message;
accessing, responsive to the chase market data, a chase protocol to determine a backoff priority;
immediately reissuing, at a time when the dedicated processing instance for the first participant has a top priority within the chase protocol, the exchange request data message for the matched data message; and TABLE 1-continued includes various examples.
Examples executing, at a time when the dedicated processing instance for the first participant lacks a top priority within the chase protocol, a backoff delay before attempting to reissue the exchange request data message for the matched data message.

11. The computer-implemented method of example 10 or any other example in this table, wherein:
determining the backoff priority includes determining a priority within a deterministic priority scheme defined within the data structure of the dedicated processing instance for the first participant;
determining the backoff priority includes determining a randomized priority;
executing the backoff delay includes executing a pre-defined delay defined within the data structure of the dedicated processing instance for the first participant;
executing the backoff delay includes executing a deterministic delay defined within the data structure of the dedicated processing instance for the first participant; and/or
executing the backoff delay includes executing a randomized delay.

12. The computer-implemented method of example 1 or any other example in this table, further including obtaining an update to the participant-specific exchange relationship mapping, the update generated in response to a benefit asymmetry identified within an exchange history between the first participant and at least one of the relationship participants.

13. The computer-implemented method of example 1 or any other example in this table, wherein:
attempting to match the current data message includes:
matching the current data message to a plurality of matched messages; and
based on the participant-specific exchange relationship mapping generating a match-priority data structure including a rank entry for each the plurality of matched messages, the rank entry defining a portion of the corresponding matched message to be filled using the current data message.

14. The computer-implemented method of example 1 or any other example in this table, wherein:
the first provider is associated with a first provider interface, the first provider having a non-peer status with the first participant; and
provider messages from the first provider interface being transmitted within the peer-to-peer exclusively as quote market data.

15. Non-transitory computer-readable media configured to store instructions thereon, the instructions for data message matching in a peer-to-peer system, the instructions configured to, when executed, cause a processor to:
receive, from a first participant, a current data message at a dedicated processing instance for the first participant, the dedicated processing instance for the first participant including dedicated compute resources for match operations specific to the first participant;
access, in a data structure at the dedicated processing interface, a participant-specific exchange relationship mapping;
determine, by the processor and based on the participant-specific exchange relationship mapping, that the first participant has an exchange relationship with one or more relationship participants;
determine, based on the participant-specific exchange relationship mapping, that the first participant lacks an exchange relationship with one or more blocked participants;
attempt to match, using a mirrored market datastore of the data structure at the dedicated processing interface and without attempting to match to data messages associated with the one or more blocked participants, the current data message to one or more provider data messages from a first provider and/or one or more previous participant data messages associated with corresponding ones of the one or more relationship participants having an exchange relationship with the first participant, the one or more previous participant data messages converted to market data based on match-failure market data conversion preferences by the corresponding ones of the one or more relationship participants, the mirrored market datastore including global market data mirrored across the peer-to-peer system;
determine, at the dedicated processing interface, whether the first participant has a match-failure market data conversion preference for the current data message;
at a time the attempt to match fails at least in part and the first participant has a match-failure market data conversion preference for the current data message:
convert the current data message to updated market data; and
globally broadcast the updated market data from the dedicated processing instance to other dedicated processing instances for other participants in the peer-to-peer system, the other participants in the peer-to-peer system including both the relationship participants and the one or more blocked TABLE 1-continued includes various examples.
Examples participants; and
cancel, at a time the attempt to match fails and the first participant lacks
a match-failure market data conversion preference for the current data
message, the current data message without distribution to the other
dedicated processing instances.
16. The non-transitory computer-readable media of example 15 or any other
example in this table, wherein the instructions are further configured to cause
the processor to maintain a mirrored state of the mirrored market datastore by
receiving, at the dedicated processing instance for the first participant, globally
broadcast data messages from dedicated processing instances for other
participants in the peer-to-peer system.
17. The non-transitory computer-readable media of example 15 or any other
example in this table, wherein the instructions are further configured to cause
the processor to receive a peer-to-peer message by receiving, at the dedicated
processing instance for the first participant, a globally broadcast data message
from a specific one of the dedicated processing instances for other
participants, the globally broadcast data message including the peer-to-peer
message, the peer-to-peer message directed from a specific one of the
dedicated processing instances for other participants individually to the first
participant.
18. The non-transitory computer-readable media of example 15 or any other
example in this table, wherein the participant-specific exchange relationship
mapping excludes relationship details for participant relationships within the
peer-to-peer system that do not include the first participant.
19. The non-transitory computer-readable media of example 15 or any other
example in this table, wherein:
the data structure of the dedicated processing instance for the first participant
further includes a visibility profile for the mirrored market datastore; and
the instructions are further configured to cause the processor to:
receive, at the dedicated processing instance for the first participant, a
request from a client interface of the first participant to view market
data within the mirrored market datastore; and
determine, by the processor and based on the visibility profile, to exclude
the market data for a matchable message associated with a visibility-
control participant, the visibility-control participant having an
exchange relationship with the first participant, the visibility-control
participant denying visibility of the market data for the matchable
message for the first participant.
20. The non-transitory computer-readable media of example 15 or any other
example in this table, wherein the instructions are further configured to cause
the processor to:
generate, at a time that the attempt to match at least in part succeeds, an
exchange request data message for a matched data message matched to the
current data message; and
receive, prior to completion of a match exchange based on the matched data
message, chase market data requesting a competing exchange associated with
the matched data message;
access, responsive to the chase market data, a chase protocol to determine a
backoff priority;
immediately reissue, at a time when the dedicated processing instance for the
first participant has a top priority within the chase protocol, the exchange
request data message for the matched data message; and
execute, at a time when the dedicated processing instance for the first participant
lacks a top priority within the chase protocol, a backoff delay before
attempting to reissue the exchange request data message for the matched data
message.
21. A device for data message matching in a peer-to-peer system, the device
including:
means for receiving, by a processor and from a first participant, a current data
message at a dedicated processing instance for the first participant, the
dedicated processing instance for the first participant including dedicated
compute resources for match operations specific to the first participant;
means for accessing, in a data structure at the dedicated processing interface, a
participant-specific exchange relationship mapping;
means for determining, by the processor and based on the participant-specific
exchange relationship mapping, that the first participant has an exchange
relationship with one or more relationship participants;
means for determining, by the processor and based on the participant-specific
exchange relationship mapping, that the first participant lacks an exchange
relationship with one or more blocked participants;
means for attempting to match, using a mirrored market datastore of the data
structure at the dedicated processing interface and without attempting to match
to data messages associated with the one or more blocked participants, the
current data message to one or more provider data messages from a first
provider and/or one or more previous participant data messages associated
with corresponding ones of the one or more relationship participants having an
exchange relationship with the first participant, the one or more previous TABLE 1-continued includes various examples.
Examples participant data messages converted to market data based on match-failure market data conversion preferences by the corresponding ones of the one or more relationship participants, the mirrored market datastore including global market data mirrored across the peer-to-peer system;
means for determining, by the processor at the dedicated processing interface, whether the first participant has a match-failure market data conversion preference for the current data message;
means for converting, by the processor and at a time the attempt to match fails at least in part and the first participant has a match-failure market data conversion preference for the current data message, the current data message to updated market data;
means for globally broadcasting, after converting the current data message, the updated market data from the dedicated processing instance to other dedicated processing instances for other participants in the peer-to-peer system, the other participants in the peer-to-peer system including both the relationship participants and the one or more blocked participants; and
means for cancelling, at a time the attempt to match fails and the first participant lacks a match-failure market data conversion preference for the current data message, the current data message without distribution to the other dedicated processing instances.
22. A system including a processor configured to perform the method of any other example in this table.
23. A product including:
a machine-readable medium; and
instructions stored on the machine-readable medium, the instructions configured to cause a processor to perform the method of any other example in the table, where:
optionally, the instructions are executable;
optionally, the machine-readable medium is non-transitory; and
optionally, the machine-readable medium is other than a transitory signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method of data message matching in a peer-to-peer system, the method including:
receiving, by a processor and from a first participant, a current data message at a dedicated processing instance for the first participant, the dedicated processing instance for the first participant including dedicated compute resources for match operations specific to the first participant;
accessing, in a data structure at the dedicated processing instance, a participant-specific exchange relationship mapping;
determining, by the processor and based on the participant-specific exchange relationship mapping, that the first participant has an exchange relationship with one or more relationship participants;
determining, by the processor and based on the participant-specific exchange relationship mapping, that the first participant lacks an exchange relationship with one or more blocked participants;
attempting to match, using a mirrored market datastore of the data structure at the dedicated processing instance and without attempting to match to data messages associated with the one or more blocked participants, the current data message to one or more provider data messages from a first provider and/or one or more previous participant data messages associated with corresponding ones of the one or more relationship participants having an exchange relationship with the first participant, the one or more previous participant data messages converted to market data based on match-failure market data conversion preferences by the corresponding ones of the one or more relationship participants, the mirrored market datastore including global market data mirrored across the peer-to-peer system;
determining, by the processor at the dedicated processing instance, whether the first participant has a match-failure market data conversion preference for the current data message;
at a time the attempt to match fails at least in part and the first participant has a match-failure market data conversion preference for the current data message:
converting, by the processor, the current data message to updated market data; and
globally broadcasting the updated market data from the dedicated processing instance to other dedicated processing instances for other participants in the peer-to-peer system, the other participants in the peer-to-peer system including both the relationship participants and the one or more blocked participants; and
cancelling, at a time the attempt to match fails and the first participant lacks a match-failure market data conversion preference for the current data message, the current data message without distribution to the other dedicated processing instances.

2. The computer-implemented method of claim 1, further including maintaining a mirrored state of the mirrored market datastore by receiving, at the dedicated processing instance for the first participant, globally broadcast data messages from dedicated processing instances for other participants in the peer-to-peer system.

3. The computer-implemented method of claim 1, further including receiving a peer-to-peer message by receiving, at the dedicated processing instance for the first participant, a globally broadcast data message from a specific one of the dedicated processing instances for other participants, the globally broadcast data message including the peer-to-peer message, the peer-to-peer message directed from a specific one of the dedicated processing instances for other participants individually to the first participant.

4. The computer-implemented method of claim 1, wherein the participant-specific exchange relationship mapping excludes relationship details for participant relationships within the peer-to-peer system that do not include the first participant.

5. The computer-implemented method of claim 1, wherein:
the data structure of the dedicated processing instance for the first participant further includes a visibility profile for the mirrored market datastore;
the method further includes:
receiving, at the dedicated processing instance for the first participant, a request from a client interface of the first participant to view market data within the mirrored market datastore; and
determining, by the processor and based on the visibility profile, to exclude the market data for a matchable message associated with a visibility-control participant, the visibility-control participant having an exchange relationship with the first participant, the visibility-control participant denying visibility of the market data for the matchable message for the first participant.

6. The computer-implemented method of claim 1, wherein the dedicated processing instance for the first participant is hosted on a compute resource unit, the dedicated compute resources maintained by capping an allowed number of dedicated processing instances hosted on the compute resource unit.

7. The computer-implemented method of claim 6, wherein the compute resource unit includes:
a cloud server;
a serverless compute reservation;
a virtual machine; and/or
a computer node within a distributed ledger network.

8. The computer-implemented method of claim 1, wherein:
attempting to match the current data message includes:
first determining, by the processor and based on credit threshold data within the data structure of the dedicated processing instance for the first participant, that fully matching the current data message with an otherwise fully matchable data message results in a credit threshold being exceeded for a credit-threshold participant of the relationship participants; and
second determining, by the processor and based on the first determining, to partially fail to match the current data message.

9. The computer-implemented method of claim 1, further including:
receiving, by the processor, incoming market data for an unmatched data message from one of the other dedicated processing instances for other participants in the peer-to-peer system; and pseudonymizing, by the processor, the incoming market data by storing the incoming market data within the mirrored market datastore using a pseudonymous identifier for the one of the other dedicated processing instances for other participants in the peer-to-peer system.

10. The computer-implemented method of claim 1, further including:
   generating, at a time that the attempt to match at least in part succeeds, an exchange request data message for a matched data message matched to the current data message; and
   receiving, prior to completion of a match exchange based on the matched data message, chase market data including a request for a competing exchange associated with the matched data message;
   accessing, responsive to the chase market data, a chase protocol to determine a backoff priority;
   immediately reissuing, at a time when the dedicated processing instance for the first participant has a top priority within the chase protocol, the exchange request data message for the matched data message; and
   executing, at a time when the dedicated processing instance for the first participant lacks a top priority within the chase protocol, a backoff delay before attempting to reissue the exchange request data message for the matched data message.

11. The computer-implemented method of claim 10, wherein:
   determining the backoff priority includes determining a priority within a deterministic priority scheme defined within the data structure of the dedicated processing instance for the first participant;
   determining the backoff priority includes determining a randomized priority;
   executing the backoff delay includes executing a predefined delay defined within the data structure of the dedicated processing instance for the first participant;
   executing the backoff delay includes executing a deterministic delay defined within the data structure of the dedicated processing instance for the first participant; and/or
   executing the backoff delay includes executing a randomized delay.

12. The computer-implemented method of claim 1, further including obtaining an update to the participant-specific exchange relationship mapping, the update generated in response to a benefit asymmetry identified within an exchange history between the first participant and at least one of the relationship participants.

13. The computer-implemented method of claim 1, wherein:
   attempting to match the current data message includes:
      matching the current data message to a plurality of matched messages; and
      based on the participant-specific exchange relationship mapping generating a match-priority data structure including a rank entry for each the plurality of matched messages, the rank entry defining a portion of the corresponding matched message to be filled using the current data message.

14. The computer-implemented method of claim 1, wherein:
   the first provider is associated with a first provider interface, the first provider having a non-peer status with the first participant; and provider messages from the first provider interface being transmitted within the peer-to-peer exclusively as quote market data.

15. Non-transitory computer-readable media configured to store instructions thereon, the instructions for data message matching in a peer-to-peer system, the instructions configured to, when executed, cause a processor to:
   receive, from a first participant, a current data message at a dedicated processing instance for the first participant, the dedicated processing instance for the first participant including dedicated compute resources for match operations specific to the first participant;
   access, in a data structure at the dedicated processing instance, a participant-specific exchange relationship mapping;
   determine, by the processor and based on the participant-specific exchange relationship mapping, that the first participant has an exchange relationship with one or more relationship participants;
   determine, based on the participant-specific exchange relationship mapping, that the first participant lacks an exchange relationship with one or more blocked participants;
   attempt to match, using a mirrored market datastore of the data structure at the dedicated processing instance and without attempting to match to data messages associated with the one or more blocked participants, the current data message to one or more provider data messages from a first provider and/or one or more previous participant data messages associated with corresponding ones of the one or more relationship participants having an exchange relationship with the first participant, the one or more previous participant data messages converted to market data based on match-failure market data conversion preferences by the corresponding ones of the one or more relationship participants, the mirrored market datastore including global market data mirrored across the peer-to-peer system;
   determine, at the dedicated processing instance, whether the first participant has a match-failure market data conversion preference for the current data message;
   at a time the attempt to match fails at least in part and the first participant has a match-failure market data conversion preference for the current data message:
      convert the current data message to updated market data; and
      globally broadcast the updated market data from the dedicated processing instance to other dedicated processing instances for other participants in the peer-to-peer system, the other participants in the peer-to-peer system including both the relationship participants and the one or more blocked participants; and
   cancel, at a time the attempt to match fails and the first participant lacks a match-failure market data conversion preference for the current data message, the current data message without distribution to the other dedicated processing instances.

16. The non-transitory computer-readable media of claim 15, wherein the instructions are further configured to cause the processor to maintain a mirrored state of the mirrored market datastore by receiving, at the dedicated processing instance for the first participant, globally broadcast data messages from dedicated processing instances for other participants in the peer-to-peer system.

17. The non-transitory computer-readable media of claim 15, wherein the instructions are further configured to cause the processor to receive a peer-to-peer message by receiving, at the dedicated processing instance for the first participant, a globally broadcast data message from a specific one of the dedicated processing instances for other participants, the globally broadcast data message including the peer-to-peer message, the peer-to-peer message directed from a specific one of the dedicated processing instances for other participants individually to the first participant.

18. The non-transitory computer-readable media of claim 15, wherein the participant-specific exchange relationship mapping excludes relationship details for participant relationships within the peer-to-peer system that do not include the first participant.

19. The non-transitory computer-readable media of claim 15, wherein:
the data structure of the dedicated processing instance for the first participant further includes a visibility profile for the mirrored market datastore; and
the instructions are further configured to cause the processor to:
receive, at the dedicated processing instance for the first participant, a request from a client interface of the first participant to view market data within the mirrored market datastore; and
determine, by the processor and based on the visibility profile, to exclude the market data for a matchable message associated with a visibility-control participant, the visibility-control participant having an exchange relationship with the first participant, the visibility-control participant denying visibility of the market data for the matchable message for the first participant.

20. The non-transitory computer-readable media of claim 15, wherein the instructions are further configured to cause the processor to:
generate, at a time that the attempt to match at least in part succeeds, an exchange request data message for a matched data message matched to the current data message; and
receive, prior to completion of a match exchange based on the matched data message, chase market data requesting a competing exchange associated with the matched data message;
access, responsive to the chase market data, a chase protocol to determine a backoff priority;
immediately reissue, at a time when the dedicated processing instance for the first participant has a top priority within the chase protocol, the exchange request data message for the matched data message; and
execute, at a time when the dedicated processing instance for the first participant lacks a top priority within the chase protocol, a backoff delay before attempting to reissue the exchange request data message for the matched data message.

21. A device for data message matching in a peer-to-peer system, the device including:

means for receiving, by a processor and from a first participant, a current data message at a dedicated processing instance for the first participant, the dedicated processing instance for the first participant including dedicated compute resources for match operations specific to the first participant;

means for accessing, in a data structure at the dedicated processing instance, a participant-specific exchange relationship mapping;

means for determining, by the processor and based on the participant-specific exchange relationship mapping, that the first participant has an exchange relationship with one or more relationship participants;

means for determining, by the processor and based on the participant-specific exchange relationship mapping, that the first participant lacks an exchange relationship with one or more blocked participants;

means for attempting to match, using a mirrored market datastore of the data structure at the dedicated processing instance and without attempting to match to data messages associated with the one or more blocked participants, the current data message to one or more provider data messages from a first provider and/or one or more previous participant data messages associated with corresponding ones of the one or more relationship participants having an exchange relationship with the first participant, the one or more previous participant data messages converted to market data based on match-failure market data conversion preferences by the corresponding ones of the one or more relationship participants, the mirrored market datastore including global market data mirrored across the peer-to-peer system;

means for determining, by the processor at the dedicated processing instance, whether the first participant has a match-failure market data conversion preference for the current data message;

means for converting, by the processor and at a time the attempt to match fails at least in part and the first participant has a match-failure market data conversion preference for the current data message, the current data message to updated market data;

means for globally broadcasting, after converting the current data message, the updated market data from the dedicated processing instance to other dedicated processing instances for other participants in the peer-to-peer system, the other participants in the peer-to-peer system including both the relationship participants and the one or more blocked participants; and means for cancelling, at a time the attempt to match fails and the first participant lacks a match-failure market data conversion preference for the current data message, the current data message without distribution to the other dedicated processing instances.

* * * * *